July 23, 1940.  G. E. SHELDRICK  2,209,174
CUTTING TOOL
Filed Oct. 10, 1938
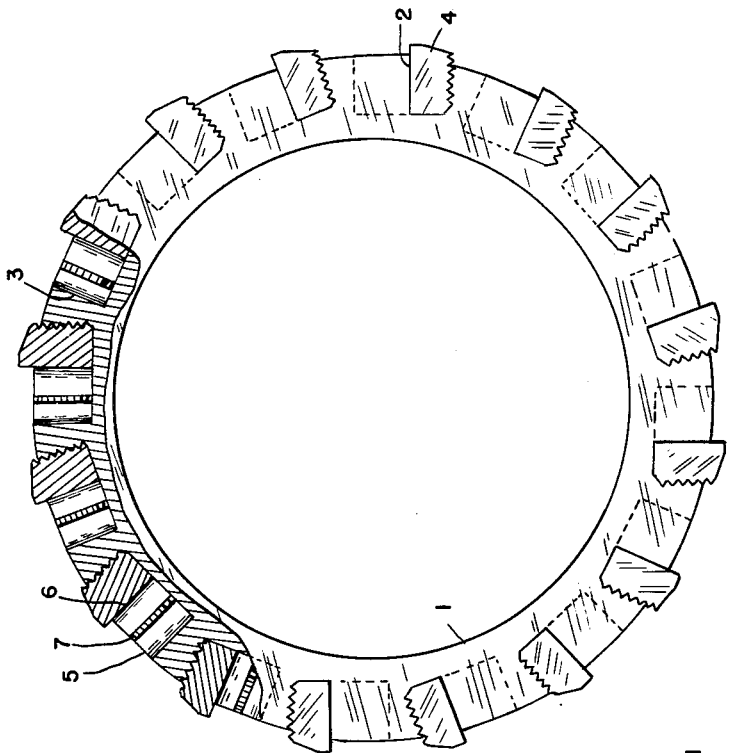
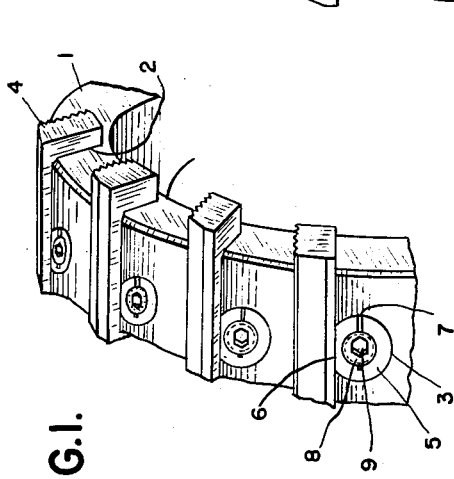
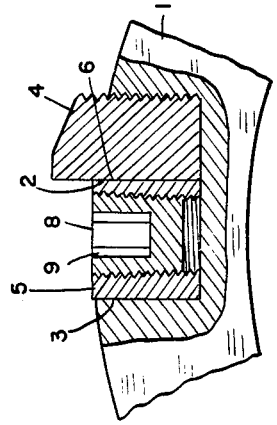
INVENTOR
GEORGE E. SHELDRICK
BY
ATTORNEYS Patented July 23, 1940

2,209,174

UNITED STATES PATENT OFFICE 2,209,174

CUTTING TOOL

George E. Sheldrick, Detroit, Mich., assignor to Midwest Tool & Manufacturing Company, Detroit, Mich., a corporation of Michigan Application October 10, 1938, Serial No. 234,302

6 Claims. (Cl. 29—105)

The invention relates to cutting tools and refers more particularly to cutting tools such as reamers, milling cutters and the like of the inserted blade type.

The invention has for one of its objects to provide an improved construction of cutting tool of the inserted blade type in which the blades are effectively secured to the body in a manner allowing of a relatively large number of blades without objectionably weakening the body. The invention has for another object to provide an improved means of securing a blade to the body by an expansible member which is expanded by an expanding member operable independently of the body. The invention has for a further object to provide an improved means of securing a blade to the body in a manner such that the forces for securing the blade act in a circumferential direction only.

These and other objects of the invention will become apparent from the following description, taken in connection with the accompanying drawing, in which:

Figure 1 is a perspective view of a cutting tool showing an embodiment of my invention;

Figure 2 is a side elevation thereof, partly in section;

Figure 3 is an enlarged sectional view.

In the present instance, the cutting tool embodying my invention is a reamer in the nature of a shell tool. I is the annular body of the cutting tool adapted to be mounted upon a suitable arbor and having the series of angularly spaced generally radial slots 2 opening outwardly and also having open ends. The body also has the generally radial outwardly opening recesses 3 with a recess communicating with each slot at one side thereof and located intermediate the ends of the cutting tool. The side of each slot opposite the recess communicating therewith is preferably serrated with the serrations extending axially of the cutting tool. Each recess, as shown, has an axially straight approximately cylindrical wall.

4 is a cutting blade located within each slot 2 and preferably having a serrated side corresponding to the serrated side of the slot. 5 is an annular expansible clamping member located in each recess 3. The clamping member is of the same shape as the recess and has the flattened side 6 which is adapted to abut the associated blade. The clamping member is transversely split in one zone with the split 7 extending substantially parallel to the flattened side. The clamping member is also internally threaded with the pitch of the threads progressively tapering inwardly from its radially outer end. 8 is an expanding screw adapted to threadedly engage each clamping member and having a taper corresponding to its internally threaded bore. Preferably, the radially outer end portion of the screw is formed with a polygonal recess 9 for engagement by a suitable tool for threading the screw into and out of its respective clamping member.

It will be noted that the clamping members 5 in their operative positions rest against the bottoms of the recesses 3 and that the screws 8 in their operative positions clear the bottoms of the recesses so that these screws are operable independently of the body 1 and do not exert any force tending to move the clamping members radially of their recesses, although they can and do exert force upon the clamping members for expanding the same to tightly clamp their respective cutting blades firmly in place. As a result, the forces created by the tightening down of the screws act in a peripheral direction and the metal of the body between adjacent recesses and slots is backed up by reason of the cutting blades. It will also be noted that the body is not weakened in any other manner to provide for the screws. Therefore, a large number of cutting blades in fairly closely spaced angular relation can be used and the construction is strong and substantial.

What I claim as my invention is:

1. In a cutting tool, a body having a slot and a recess communicating with the slot, a cutting blade extending within the slot, an expansible member extending within the recess, and an expanding member carried wholly by said expansible member independently of said body and operable to expand said expansible member into clamping relation with said blade.

2. In a cutting tool, a body having a slot and a recess communicating with the slot, a cutting blade extending within the slot, an expansible member extending within the recess, an expanding member carried by said expansible member, and cooperating means upon said expansible and expanding members for effecting relative movement thereof to cause expansion of said expansible member into clamping relation with said blade.

3. In a cutting tool, a body having a slot and a recess communicating with the slot, a cutting blade extending within the slot, an internally threaded expansible clamping member extending within the recess, and an expanding screw threadedly engaging said clamping member and clearing said body for expanding said clamping member into clamping relation with said blade.

4. In a cutting tool, a body having angularly spaced generally radial slots and recesses with a recess communicating with each slot, cutting blades extending within the slots, expansible clamping members extending within the recesses and each occupying a predetermined position radially of said body, and an expanding screw clearing said body and threadedly engaging each clamping member for expanding the latter in a circumferential direction into clamping relation with said blade.

5. A device of the character described comprising, a cutter head having a rectangular groove therein, one of the side walls of said groove being serrated lengthwise therealong, a rectangular shaped cutter blade adapted to fit into said groove, one side of said blade being serrated to fit said groove serrations, said head having a cylindrical opening therein which intersects the non-serrated side of said groove, an expansion sleeve disposed in said cylindrical opening having a tapered threaded bore therein, and a threaded tapered plug adapted to be screwed into said sleeve and expand same into said opening and force said blade against the serrated side of said groove to retain same in position.

6. A device of the character described comprising, a cutter head having a rectangular groove therein, one side wall of said groove being serrated lengthwise therealong, said head having a cylindrical opening therein which intersects the non-serrated side of said groove, a rectangular shaped cutter blade adapted to fit into said groove, one side of said blade being serrated to fit said groove serrations, said blade serrations extending parallel to the cutting edge of said blade, an expansion sleeve disposed in said cylindrical opening, said sleeve having a tapered threaded bore therein, and a threaded tapered plug adapted to be screwed into said sleeve to expand the same into said opening and force said blade against the serrated side of said groove.

GEORGE E. SHELDRICK.